United States Patent [19]

Azorlosa

[11] 4,158,647

[45] Jun. 19, 1979

[54] MULTIFUNCTIONAL ACRYLATE N-VINYLAMIDE ANAEROBIC ADHESIVE COMPOSITIONS

[75] Inventor: Julian L. Azorlosa, Kinnelon, N.J.

[73] Assignee: GAF Corporation, New York, N.Y.

[21] Appl. No.: 883,467

[22] Filed: Mar. 6, 1978

Related U.S. Application Data

[62] Division of Ser. No. 757,473, Jan. 7, 1977, Pat. No. 4,104,458.

[51] U.S. Cl.$^2$ .............................................C08F 220/20
[52] U.S. Cl. ................................... 260/13; 260/17 A;
260/885; 428/439; 428/442; 428/464; 428/500;
526/260; 526/263; 526/264; 526/287; 526/304
[58] Field of Search ....................... 260/13, 17 A, 885;
526/323.2, MS File

[56] References Cited

U.S. PATENT DOCUMENTS

| | | | |
|---|---|---|---|
| 3,883,453 | 5/1975 | Takahashi et al. | 260/17 A |
| 3,901,858 | 8/1975 | Sugiyama et al. | 526/323.2 |

*Primary Examiner*—Harry Wong, Jr.
*Attorney, Agent, or Firm*—Walter C. Kehm; Walter Katz

[57] ABSTRACT

A solventless, fast-setting anaerobic adhesive composition comprises two monomer parts which are adapted to be copolymerized anaerobically at ambient temperature between opposing surfaces to form a high-strength bond thereto. One part comprises a multifunctional acrylate monomer and the other an N-vinylamide monomer. The formulation also includes a redox system consisting of oxidizing and reducing agent components for initiating polymerization between said monomers. The oxidizing agent of the redox system may be present in either one of said parts, preferably with the multifunctional acrylate. The reducing agent is present in the other part, usually the N-vinylamide. Upon anaerobic admixing of the respective parts of the composition at ambient temperature, the oxidizing and reducing agents react to generate free radicals which initiates copolymerization of the monomers to form the desired high-strength adhesive bond to said surfaces.

8 Claims, No Drawings

MULTIFUNCTIONAL ACRYLATE N-VINYLAMIDE ANAEROBIC ADHESIVE COMPOSITIONS

This application is a divisional of Ser. No. 757,473, filed Jan. 7, 1977, now U.S. Pat. No. 4,104,458, issued Aug. 1, 1978.

BACKGROUND OF THE INVENTION

1. Field of the Invention

This invention relates to solventless, fast-setting, anaerobic adhesive composition for bonding together two or more substrates by anaerobic polymerization.

2. Description of the Prior Art

The phenomenon of anaerobic polymerization is one that is well known in the art and one which is readily effected in commercial practice by interposing an adhesive composition between two opposing substrate surfaces that are to be bonded together with such adhesive composition. Upon such substrate surfaces being pressed together, air is thereby excluded, giving rise to rapid polymerization of the adhesive composition which, in turn, causes the two substrates to be bonded via the resultant polymerized adhesive composition.

The use of acrylate monomers for this purpose is well know and described in a number of prior U.S. patents, such as U.S. Pat. Nos. 3,419,512, 3,425,988 and 3,435,012. For example, U.S. Pat. No. 3,419,512 discloses anaerobic adhesive compositions comprising monomers of dimethylacrylate or diacrylate esters of polyglycols, an organic peroxide polymerization initiator, water, an acid or acid salt, and, optionally, an organic tertiary amine and a plasticizer, and teaches that such compositions are capable of attaining a range of specified bond strengths within rapid setting times. U.S. Pat. No. 3,425,988 relates to polyurethane-polyacrylate sealant compositions comprising the reaction product of an acrylate ester, an organic polyisocyanate and a peroxy polymerization initiator, which compositions polymerize when placed between non-porous substrate surfaces.

Previous bonding processes, such as those above, that have been characterized by interposing a polymerizable adhesive composition between a plurality of substrates, or by applying an adhesive composition to the surface of one substrate and then pressure contacting the resultant adhesive-containing substrate surface to a second substrate, have frequently given rise to inferior products that have been characterized by non-uniform bond strength, owing to slight variations in thickness and the like of the intermediate adhesive layer, or decreased bond strength of the resultant bonded material over a moderate time span such as a month. Furthermore, such prior art processes have quite often required the use of solvents in order to promote bonding or to "activate" the substrate surfaces. Such solvents have often proved to be undesirable, both from pollution and fire hazard standpoints, and for use in bonding solvent impervious surfaces.

Accordingly, it is an object of the present invention to provide new and improved solventless, fast-setting anaerobic adhesive compositions which are capable of forming high-strength bonds to substrate surfaces at ambient temperatures.

SUMMARY OF THE INVENTION

A solventless, fast-setting anaerobic adhesive composition comprises two monomer parts which are adapted to be copolymerized anaerobically at ambient temperature between opposing surfaces to form a high-strength bond thereto. One part comprises a multifunctional acrylate monomer and the other an N-vinylamide monomer. The formulation also includes a redox system consisting of oxidizing and reducing agent components for initiating polymerization between said monomers. The oxidizing agent of the redox system may be present in either one of said parts, preferably with the multifunctional acrylate. The reducing agent is present in the other part, usually the N-vinylamide. Upon anaerobic admixing of the respective parts of the composition at ambient temperature, the oxidizing and reducing agents react to generate free radicals which initiates copolymerization of the monomers to form the desired high-strength adhesive bond to said surfaces.

DESCRIPTION OF THE PREFERRED EMBODIMENTS

In accordance with the present invention, Part A comprises a multifunctional acrylate monomer which has at least two acrylate groups per molecule, such as a diacrylate or a triacrylate. Preferred multifunctional acrylates are those which are formed by esterification densation of polyols with acrylic acid. Thus, suitable multifunctional acrylates include 1,6-hexanediol diacrylate, trimethylolpropane trimethacrylate, diethylene glycol diacrylate, dipropylene glycol dimethacrylate and diglycerol dimethacrylate.

Part B of the formulation contains a monomer which will copolymerize anaerobically with the multifunctional acrylate component at ambient temperature to form a crosslinked copolymer of high-strength. In accordance with the invention, this monomer is an N-vinylamide which polymerizes through its ethylenic group. Suitably N-vinylamides include N-vinyl carboxylic amides and N-vinyl sulfonamides. Preferred N-vinyl carboxylic amides are the N-vinyl lactams. Exemplary of such N-vinyl lactams are N-vinyl-2-pyrrolidone and its alkylated analogs, such as N-vinyl-5-methyl-2-pyrrolidone, N-vinyl-3, 3-dimethyl-2-pyrrolidone, N-vinyl-2-piperidone, N-vinyl-6-caprolactam, N-vinyl-hexahydro-phthalamidine, N-vinyl naphthostyrile and N-vinyl-morpholidone.

Polymerization between said monomers is initiated by a suitable redox system, to be described in detail hereafter.

In operation, parts A and B are polymerized anaerobically by applying them to one or both opposing surfaces desired to be bonded together, and pressing the surfaces together, thereby to shut off the supply of air therebetween. Advantageously, the combination of monomers herein has been found to copolymerize anaerobically at a rate faster than either monomer alone. The resultant copolymer forms an adherent, high-strength bond to both surfaces.

The redox system which initiates polymerization between the monomers when the parts are admixed anaerobically includes an oxidizing agent and a reducing agent. The oxidizing agent is present in one part of the formulation, for example, in part A, and the reducing agent is present in the other part of the formulation, for example, in part B. Thereby, upon admixing of the respective parts, the oxidizing and reducing agents react to generate free radicals which initiates the desired polymerization.

Preferably the oxidizing agent is present in the acrylate moiety of the formulation and is an organic peroxide or an organic hydroperoxide. Suitable organic peroxides for use herein include diacyl peroxides, such as diacetyl, dibenzoyl, and dilauroyl peroxide; dialkyl peroxides, such as di-t-butyl peroxide; and cyclohexene peroxide. Suitable hydroperoxides include t-butyl hydroperoxide and p-methane hydroperoxide.

The reducing agent of the redox system preferably is present as a component of the N-vinylamide part of the formulation. Typical reducing compounds of the invention are aliphatic and aromatic amines, including diamines, triamines, tetraamines, etc., including N-alkylated amines, and metallo-organic compounds. Exemplary of such reducing agents are triethylenetetraamine, N,N-diethylaniline and cuprous acetonylacetonate.

The oxidizing and reducing agents preferably should be soluble in their respective parts of the formulation, and also not cause premature polymerization of the monomer prior to admixing of both parts. Furthermore, it is also preferable that the oxidizing and reducing agents be selected as a particularly useful pair for performing their desired function.

The oxidizing and reducing agents are present in an amount sufficient to generate the necessary free radicals to initiate polymerization. Usually about 0.1% to about 5% by wt. of said part is sufficient, preferably about 2%–3% by wt.

| PREFERRED REDOX SYSTEMS | |
|---|---|
| Oxidizing Agent | Reducing Agent |
| Organic hydroperoxide | Polyamine-$H_2N(-C-C-NH_n)H$ |
| t-Butyl hydroperoxide | n = 1-8 triethylenetetraamine |
| Organic peroxide | N-Alkylated aromatic amine |
| Benzoyl peroxide | N,N-Diethylaniline |
| Organic hydroperoxide | Metallo-organic |
| Cumene hydroperoxide | Cuprous acetonylacetones |

In order to provide a more useful formulation for practical application as an adhesive, it may be necessary to adjust the viscosity of each part so as to produce a somewhat viscous liquid which can be applied easily to the substrate surfaces and retained therebetween while polymerization occurs. If the monomer themselves are relatively viscous, then they may be used directly. However, if the monomer is too thin, i.e. a free-flowing liquid, it is necessary to add a thickener, that is, a soluble resin which will increase the viscosity of the monomer, and not inhibit polymerization. Preferably, it should increase the viscosity of the monomer to between 50–5000 centipoises. For many multifunctional acrylate and N-vinylamide monomers, it is necessary to add resin in the amount of between about 5–50% by wt. of the monomer. Suitable resins include cellulose acetate, polyvinyl acetate, and other well known resins suitable for this purpose.

To effect bonding, there are two preferred modes of application:

(1) applying parts A and B separately to each of two surfaces to be adhered, and pressing the surfaces together firmly until the polymerization occurs and the bond begins to set.

(2) premixing parts A and B on one surface and then pressing the second untreated surface on top of the adhesive-moistened surface. If the mixture of parts A and B is not too thick e.g. 1.0 mils or less, no reaction or pre-setting up of the adhesive will occur for some time since air inhibits polymerization. However, once the glue is sandwiched between the two materials to be adhered, air is cut off and consequently, polymerization takes place.

Preferably, parts A and B are admixed so as to effect copolymerization between the monomers to form a cross-linked copolymer having about a 1:1 molar ratio of acrylate group to N-vinylamide. The molar equivalent of an acrylate group is calculated by dividing the molecular weight of the multifunctional acrylate monomer by the number of acrylate groups present therein, e.g. two, three, etc. This bond developed with this composition is produced within the fastest setting times. However, other ratios may be used as well, including most suitably an excess of the multifunctional acrylate, preferably up to a ratio of about 10:1, which insures that no residual, unpolymerized N-vinylamide will be present after polymerization. Excess acrylate is desirable since many N-vinylamides have characteristic odors which would persist in the region of the bond. On the other hand, if too much acrylate is present, then polymerization will proceed at a slower rate, and produce a weaker bond. Therefore, it is more nearly an optimum condition to maintain a slight excess of acrylate over the 1:1 ratio.

To improve the bond strength and to speed up the polymerization, a quantity of aluminum powder may be added to either or both parts of the formulation. Generally about 10% by wt. of aluminum will result in the improvement desired with respect to these parameters.

Generally the setting times of the adhesive composition of the invention is less than 60 seconds, and often as low as 5 seconds. Occasionally, the setting times may be somewhat longer particularly if the surfaces to be bonded are rather porous.

The present invention may be illustrated further by means of the following examples which are not intended to limit the scope of the invention in any way.

EXAMPLE I

The following solutions were made up:

| | (Eastman's) |
|---|---|
| Part A: | 7 g. EAB-500-5 (cellulose acetate butyrate) |
| | 93 g. 1, 6-hexanediol diacrylate |
| | 3 g. t-butyl hydroperoxide (70% by wt.) |
| Part B: | 7 g. EAB-500-5 |
| | 93 g. N-vinylpyrrolidone |
| | 3 g. triethylenetetraamine |

One half ml. of Part A was placed on a glass plate; ½ ml. of Part B was placed on another glass plate. The two glass plates were pressed together so that the two components were pushed together to give a thin glue line 0.3 ml. Within 60 seconds a firm bond resulted.

What is claimed is:

1. A solventless, fast-setting adhesive composition consisting essentially of two monomer parts which are adapted to be copolymerized anaerobically at ambient temperature between opposing surfaces to form a high-strength bond thereto one of said parts being an ethylenically unsaturated polymerizable multifunctional acrylate monomer and the other part an N-vinylamide monomer, one of said parts having an oxidizing agent present therein and the other part a reducing agent, said agents being capable of reacting when brought together to initiate copolymerization of said monomers to form said desired bond, characterized in that a soluble resin is included with said first or second parts, to increase the viscosity of the monomer in that part to that of a viscous liquid, but not inhibit the polymerization.

2. The composition according to claim 1 wherein said viscous liquid has a viscosity of about 50–5,000 cps.

3. The composition according to claim 1 wherein said resin is present in an amount of about 5–50% by weight of said part.

4. The composition according to claim 1 wherein said first part is made up of about 5–50% by weight resin, 50–95% by weight multifunctional acrylate, 0.01–5% by weight oxidizing agent, said part having a viscosity between about 50–5,000 cps.

5. The composition according to claim 1 wherein said one part consisting essentially of about:
- 93 g. 1,6-hexanediol diacrylate
- 3 g. t-butyl hydroperoxide (70% by wt.)
- 7 g. cellulose acetate butyrate, and said other part comprises about:
- 93 g. N-vinylpyrrolidone
- 3 g. triethylenetetraamine
- 7 g. cellulose acetate butyrate.

6. The composition according to claim 1 wherein said one part consisting essentially of about:
- 20 g. 1,6-hexanediol diacrylate
- 2 g. benzoyl peroxide
- 8 g. cellulose acetate butyrate, and said other part comprises about:
- 90 g. N-vinylpyrrolidone
- 2 g. N,N-diethylaniline
- 8 g. cellulose acetate butyrate.

7. The composition according to claim 1 wherein said one part consisting essentially of about;
- 60 g. 1,6-hexanediol diacrylate
- 3 g. benzoyl peroxide
- 40 g. polyvinyl acetate and said other part comprises about:
- 60 g. N-vinylpyrrolidone
- 3 g. N,N-diethylaniline
- 40 g. polyvinyl acetate.

8. The composition according to claim 1 wherein said one part consisting essentially of about:
- 93 g. 1,6-hexanediol diacrylate
- 3 g. benzoyl peroxide
- 7 g. cellulose acetate butyrate
- 10 g. aluminum powder, and said other part comprises about:
- 60 g. N-vinylpyrrolidone
- 3 g. N,N-diethylaniline
- 40 g. polyvinylacetate.

* * * * *